Feb. 22, 1966  J. E. EYNON  3,236,274
MULTI-TREE LENGTH SLASHER
Filed April 30, 1963  8 Sheets-Sheet 4
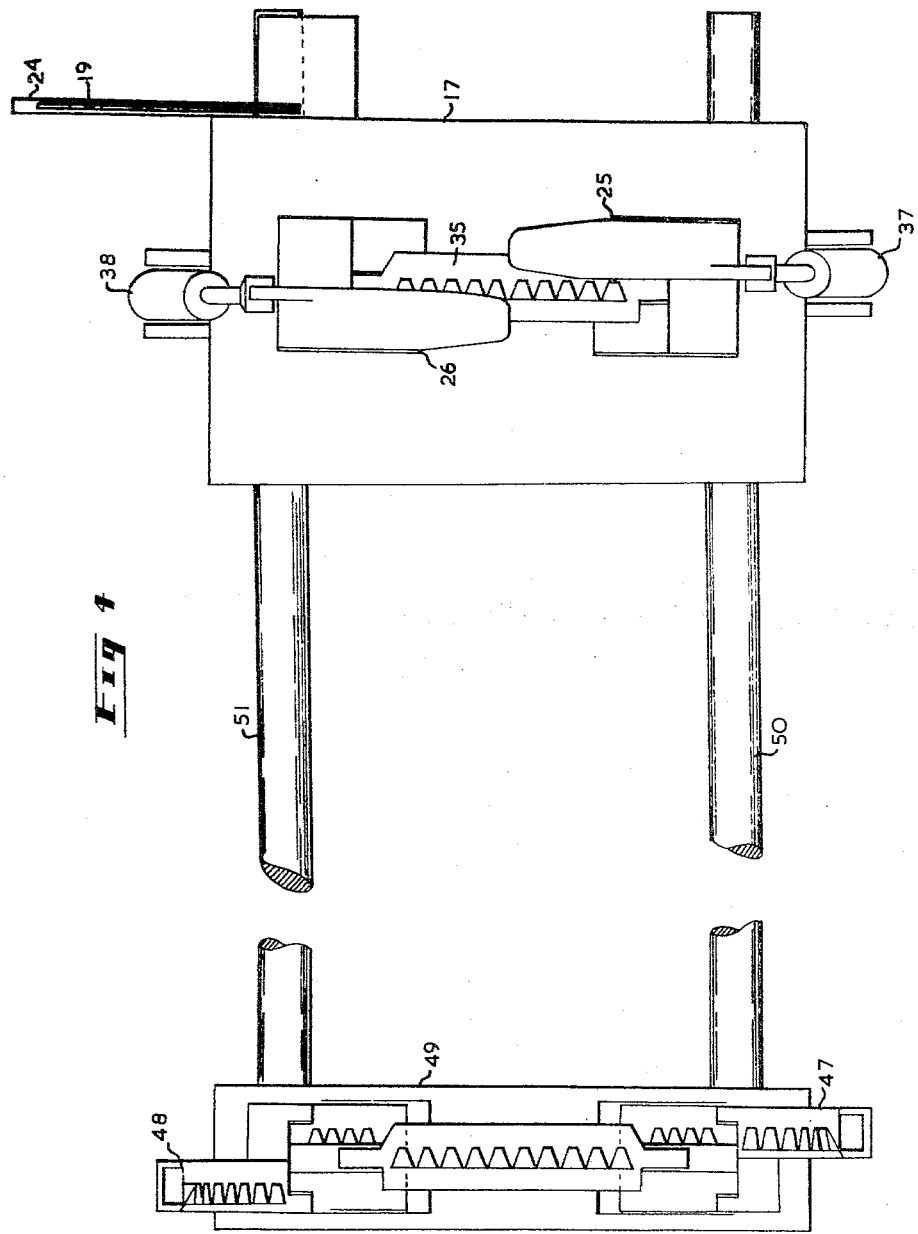
Inventor
John E. Eynon
By Stevens Davis Miller & Mosher
Attorneys

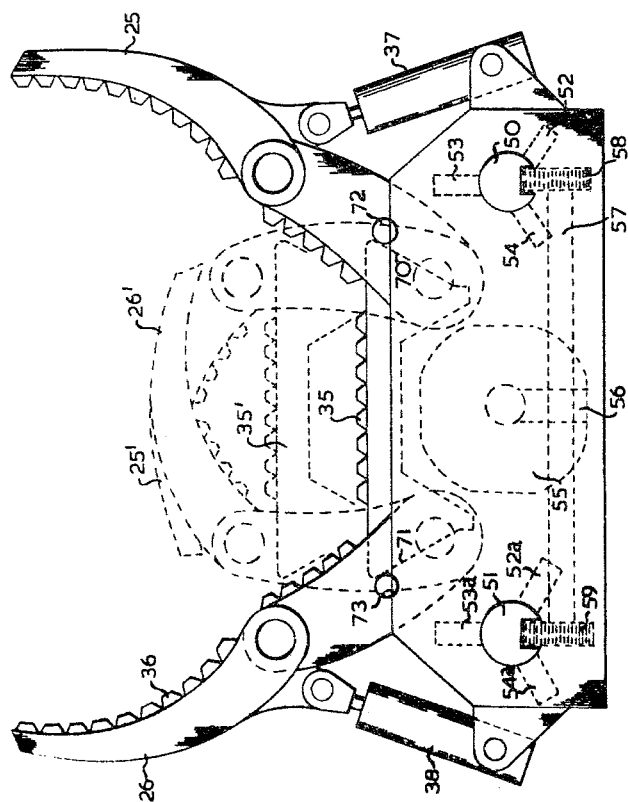

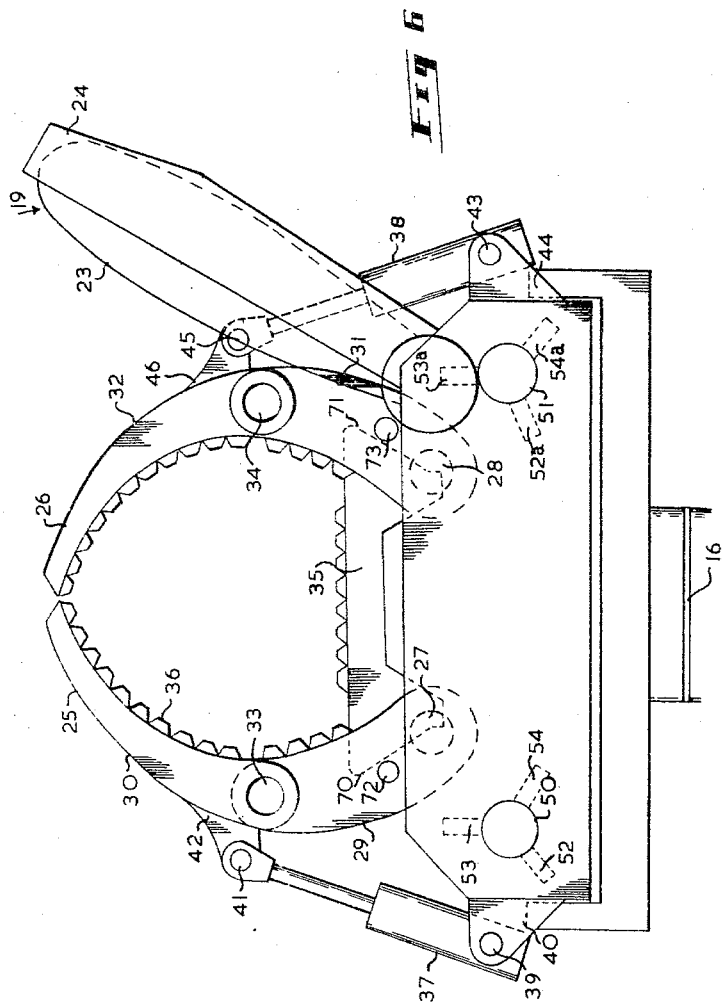

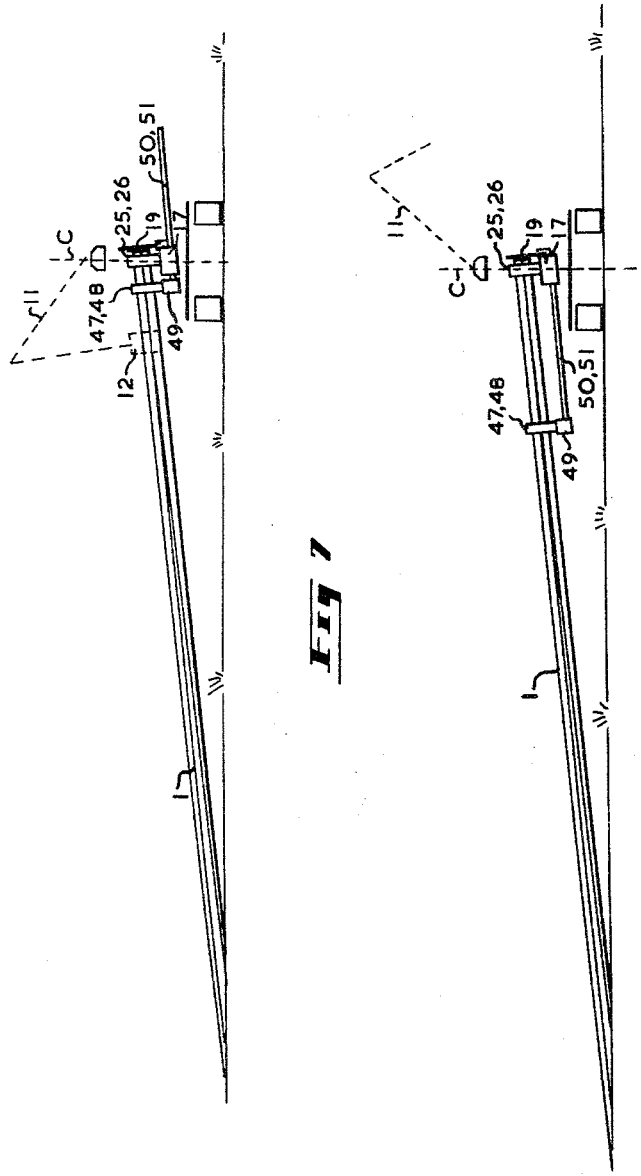

Feb. 22, 1966 J. E. EYNON 3,236,274
MULTI-TREE LENGTH SLASHER
Filed April 30, 1963 8 Sheets-Sheet 8

Inventor
John E. Eynon
By Stevens Davis Miller & Mosher
Attorneys

3,236,274
MULTI-TREE LENGTH SLASHER
John E. Eynon, Fort William, Ontario, Canada, assignor to Abitibi Power & Paper Company, Limited, Iroquois Falls, Ontario, Canada, a corporation of Canada
Filed Apr. 30, 1963, Ser. No. 276,780
Claims priority, application Canada, Jan. 23, 1963, 867,180
18 Claims. (Cl. 144—312)

This invention is concerned with an apparatus and method for handling, feeding, and cutting logs.

There is considerable evidence today that the economic development of the tree length forwarding technique is prejudiced in many instances by the lack of suitable equipment for processing in the woods.

There is obviously little economic gain in eliminating bucking and piling in the strip, only to carry out this operation in a similar manner at the forwarding point.

Slashing equipment presently available falls into two widely separated categories—high capacity units, and small single stem machines having an inherently low rate of production on small diameter wood and little, if any, ability to dispose of bucked wood. None of these machines is mobile in the sense that they are able to move readily between sites and when in operation on a site they lack the facility of moving readily to tree length decks and away from ranked piles of processed wood.

The high capacity semiportable units usually entail some form of tree length pre-haul and with the output directly to trucks or trailers the operation becomes integrated to a degree not always efficient or desirable.

It is frequently uneconomic, or undesirable for other reasons, to have access roads fully developed to forwarding sites during the season or period the wood is to be cut and skidded as there is no opportunity here to pre-haul; thus production must be slashed and piled down by hand.

It is characteristic of most tree length operations that the production, once skidded, has to be immediately slashed, piled down and/or hauled; or hauled as tree lengths. The alternative—to cold deck by one method, or another is a non-productive operation, the cost of which is difficult to recover.

The general object of this invention is to provide a unit which has a high degree of mobility. To accomplish this result the unit must be self-propelled and go virtually anywhere a skidder can go, thus being entirely independent of access road construction and site conditions. Maneuverability around the site must be good regardless of terrain.

A further object of this invention is to provide a compact unit to allow effective operation on restricted sites as well as a versatile unit which can operate from hot or cold decks.

The main object of this invention is to provide a multi-tree length slasher unit with a feed mechanism for mechanically and automatically feeding logs, particularly tree length logs, from a deck to a cutting means which cuts said logs into convenient length. It is then desired to provide for mechanical piling of these logs. The slasher unit provides an apparatus which is independent of tree diameter in that it is capable of reaching optimum output on small as well as large wood. An essential function of the invention is the facility of processing more than one tree stem at a time thus making the machine capable of maintaining output on small as well as large diameter wood. A multi-tree length slasher apparatus according to the present invention could process from one to five tree lengths at the same time.

The foregoing objects are achieved in accordance with this invention by providing a multi-tree length slasher apparatus for handling and cutting logs which consist of a log feeding mechanism for feeding logs to a cutting means, a means for supplying logs to said feeding mechanism, means for removing cut logs from the said mechanism and a power plant.

The log feeding mechanism consists preferably of two sets of jaws, one of which would be substantially stationary, called holding jaws, and the other called feeding jaws which are arranged to travel in and out from the holding jaw. The holding jaw is mounted on a feed mechanism housing or block which contains a means for extending and retracting the shafts carrying the feeding jaws. Suitable means for extending and retracting the shafts carrying the feeding jaws may be a rack and pinion arrangement. Other means may be an arrangement of lever arms and at least one hydraulic cylinder, or by means of at least one hydraulic cylinder and a type of sheave separation with cable or roller chain. The aforementioned housing is mounted on a swivel mounting plate.

The feeding and holding jaws are substantially identical and designed to effectively hold stems of varying size and numbers. The cutting of the logs could be carried out by means of a hydraulic shear or powered chain saw, preferably hydraulic, operating in a vertical arc and mounted on the feed block housing. This will permit a perpendicular cut regardless of the slew or cant angle of the tree length logs. A conveying mechanism consisting of two carrying rails, which extend immediately below the log lengths to be cut and having two pair of guide arms fitted with track rollers engaging the flanges on the carrying rails conveys the cut wood down and across the swivel mounting plate to a pulp cradle mounted on and moving with the swivel mounting plate. The cut logs deposited in the cradle are then removed mechanically by a boom and grapple to a stockpile of cut pulpwood length logs.

The advantage of the multi-tree length slasher is that the tree length logs can be fed to the cutting means from any of a range of angles and yet obtain a cut substantially perpendicular to the axis of the logs. Therefore the logs can be supplied to the feed mechanism by raising one end only of the logs and skidding them to the feed mechanism without any attempt being made to secure a particular alignment. This operation reduces both the time consumed and the labour or equipment needed as compared with the previous technique of aligning the logs with the shearing means.

Reference will now be made to the drawings which illustrate the preferred embodiment of this invention.

FIGURE 4 is a plan view of the log feeding mechanism of a mobile multi-tree length slasher apparatus.

FIGURE 5 is left end elevation of the log feeding mechanism of FIGURE 4.

FIGURE 6 is right end elevation of the log feeding mechanism of FIGURE 4.

FIGURE 7 is a side elevation view showing the tree length charging of the slasher apparatus.

FIGURE 8 is a side elevation view showing the start of the log feed sequence.

Figure 1:
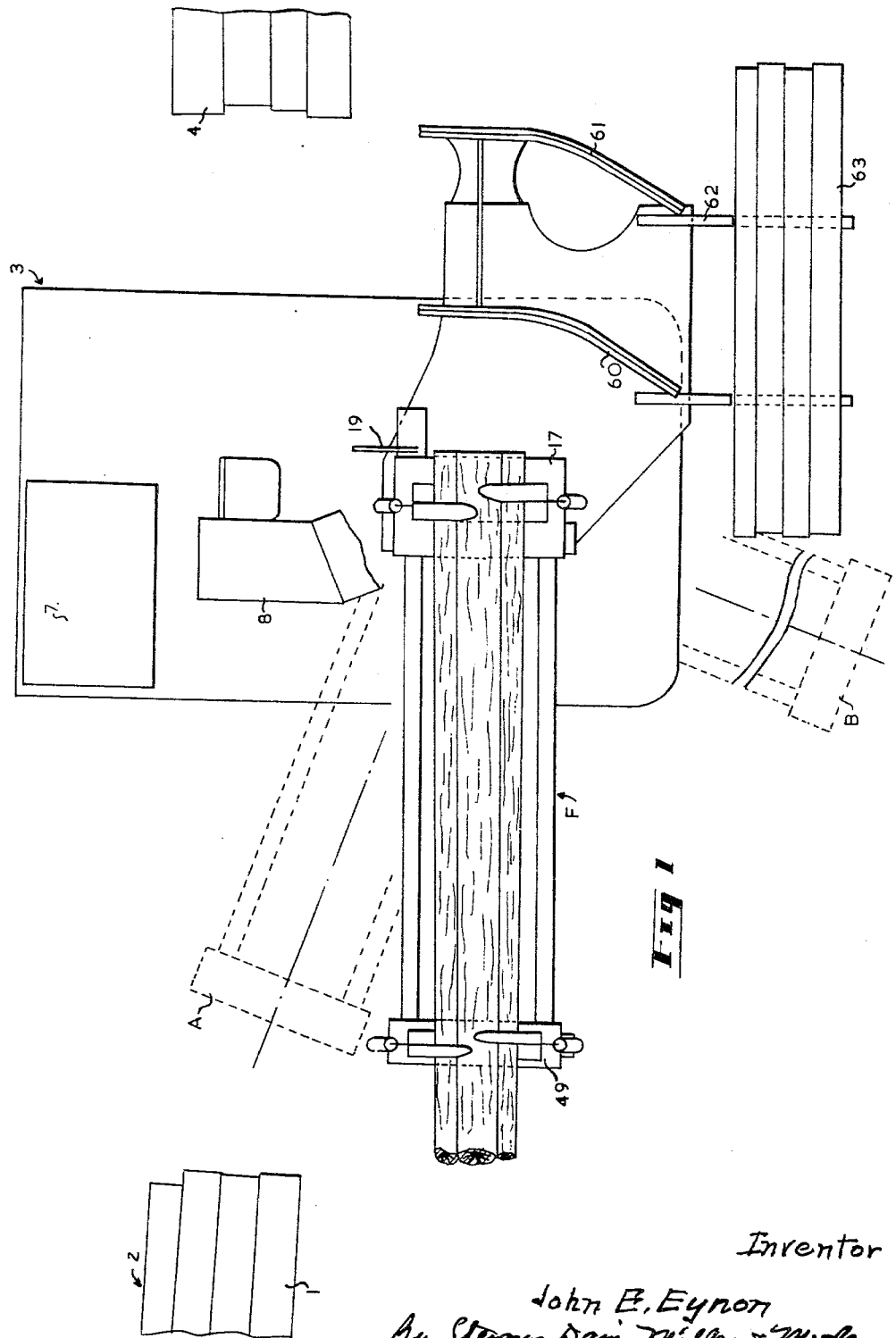
FIGURE 1 is a plan view illustrating a deck of tree length logs, a mobile multi-tree length slasher apparatus and a pile of pulpwood length logs.
Figure 2:
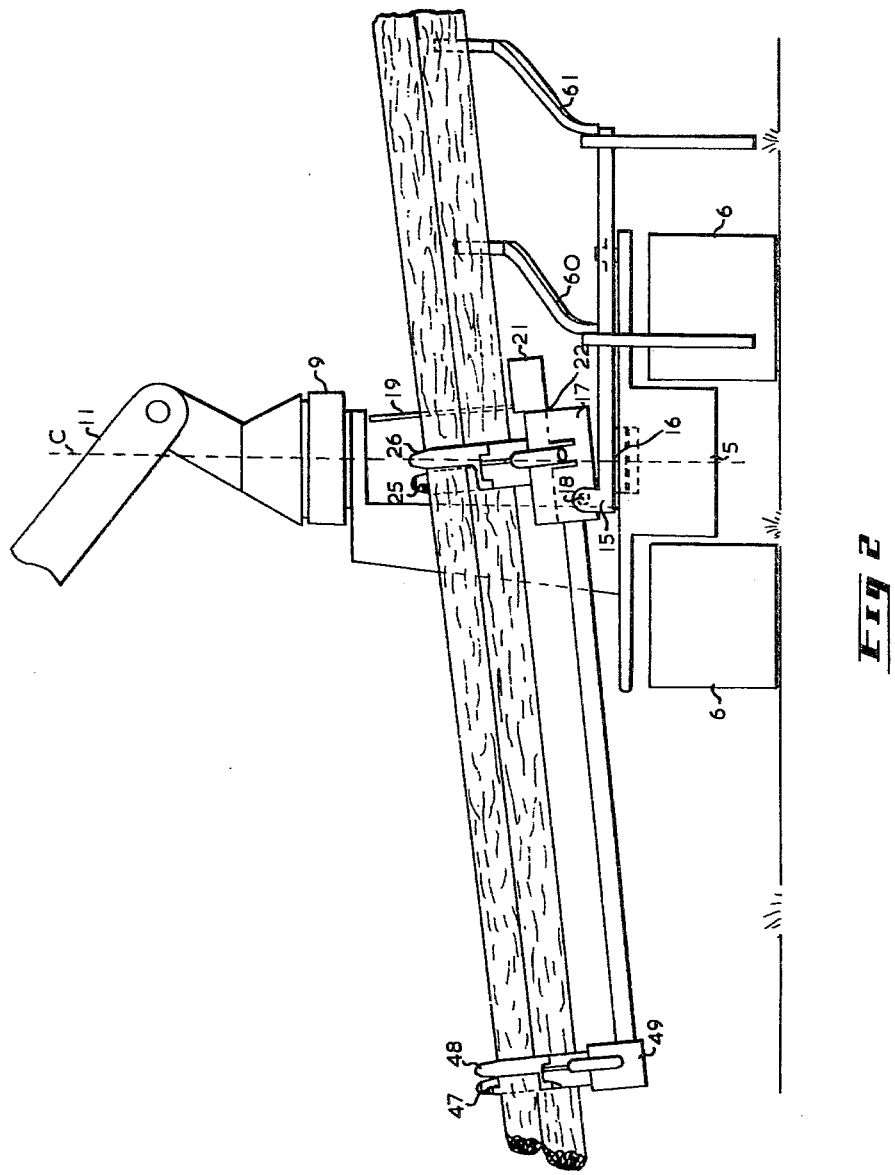
FIGURE 2 is a front elevation view of the mobile multi-tree length slasher apparatus of FIGURE 1.

Referring now to the drawings, tree length logs 1 which may for example be 35 to 50 feet in length and have butt diameters of 6 to 18 inches are located in the decking area designated generally by the numeral 2. A mobile multi-tree length slasher apparatus is designated generally by the numeral 3 and contains a feed mechanism designated generally by the letter F. The pile of cut pulpwood length bolts is designated generally by the numeral 4.

The mobile multi-tree length slasher apparatus 3 comprises a supporting chassis 5 mounted on caterpillar tracks 6. A power plant for operating the slasher apparatus is designated by the numeral 7. A suitable power plant for the purposes desired by the invention is a 60 horsepower diesel engine. Mounted on chassis 5 is a body structure 8 including platform 9 and supporting webs 10. A knuckle boom 11 having a grapple 12 is mounted on platform 9 so that it may be rotated through 360°. Conventional hydraulic means which are not shown in detail but which are generally indicated at 13 and 14 are provided for actuating the knuckle boom 11. Hydraulic means (not shown) also control grapple 12 and the traversing of the knuckle boom 11.

A swivel mounting plate 15 is pivotally mounted by a pivot bearing 16 on chassis 5. A feed mechanism housing 17 is pivotally connected by pivotal mounting 18 to the swivel mounting plate 15. The movement of swivel mounting plate 15 is controlled by hydraulic means (not shown). By this connection, it means that the feed mechanism housing 17 can both swivel and cant. Cutting or bucking means 19 is mounted on plate 21 which is integrally connected at 22 to feed mechanism housing 17. In FIGURE 6 cutting means 19 is illustrated as being a chain saw 23 which has a protective guard 24. Chain saw 23 can be driven in any suitable manner such as by hydraulic means (not shown). A pair of holding jaws 25 and 26 are pivotally mounted on feed mechanism housing 17 by pins 27 and 28 respectively. Holding jaw 25 is composed of two arms 29 and 30 pivotally joined by pin 33. Holding jaw 26 is composed of two arms 31 and 32 pivotally joined by pin 34. A throat piece 35 is adjustably mounted on feed mechanism housing 17 between holding jaws 25 and 26 so that it co-operates with holding jaws 25 and 26 when they are opened or closed. The actual raising of throat piece 35 is accomplished by means of the interaction of the cam surfaces 70 and 71 of throat piece 35 with rollers 72 and 73 which are integrally mounted on the lower arms 29 and 31 of holding jaws 25 and 26 respectively. Holding jaws 25 and 26 and throat piece 35 are preferably lined with teeth like perforations 36. The pair of holding jaws 25 and 26 are actuated by hydraulic means 37 and 38 respectively. Hydraulic means 37 is pivotally mounted at its bottom end by pin 39 to lugs 40 which are integrally connected to feed mechanism housing 17 and is attached at its top end by pin 41 to lug 42 which is integrally connected to holding jaw 25. Hydraulic means 38 is pivotally mounted at its bottom end by pin 43 to lugs 44 which are integrally connected to feed mechanism housing 17 and is attached at its top end by pin 45 to lug 46 which is integrally connected to holding jaw 26.

FIGURE 6 shows the holding jaws 25 and 26 in loosely closed position while FIGURE 5 shows the holding jaws fully open and tightly closed. In the fully open position the holding jaws are designated by their usual numerals 25 and 26 but in the tightly closed position they are designated by the numerals 25' and 26' and throat piece 35 is designated by the numeral 35' in this position.

A pair of feeding jaws 47 and 48 are pivotally mounted on a housing 49. Housing 49 is connected to feed mechanism housing 17 by a pair of feeding shafts 50 and 51. Said feeding jaws 47 and 48 being connected to the feed mechanism housing 17 by said pair of feeding shafts 50 and 51 so that they are in the same plane and work in co-operation with holding jaws 25 and 26. The pair of feeding jaws 47 and 48 are constructed the same and activated in the same manner as holding jaws 25 and 26 and it is therefore not necessary to redescribe the feeding jaws 47 and 48 in complete detail.

Feeding shafts 50 and 51 are adapted to co-operate with feed mechanism housing 17 so that they may retract or rack in the feeding jaws 47 and 48 towards holding jaws 25 and 26 or that they may extend or rack out feeding jaws 47 and 48 away from holding jaws 25 and 26. It is desirable that feeding shafts 50 and 51 be so constructed so that there may be 100" movement from the retracted or racked in position of feeding jaws 47 and 48 when adjacent or next to holding jaws 25 and 26 to the extended or racked out position of feeding jaws 47 and 48, as shown in FIGURE 4.

Feeding shaft 50 is facilitated in its movement through housing 17 by roller bearings 52, 53 and 54. Feeding shaft 51 is facilitated in its movement through housing 17 by roller bearings 52a, 53a and 54a. These roller bearings also aid in maintaining feeding shafts 50 and 51 in correct alignment.

Feeding shafts 50 and 51 are racked in or out by means of motor 55 located on feed mechanism housing 17. It is preferred that motor 55 be a hydraulic motor. Motor 55 is equipped with a worm and gear drive 56. Power is transmitted from the worm and gear drive 56 through a shaft 57 to a rack and pinion means 58 and 59. Said rack and pinion means 58 and 59 are adapted to rack in and out said feeding shafts 50 and 51 respectively.

Figure 3:
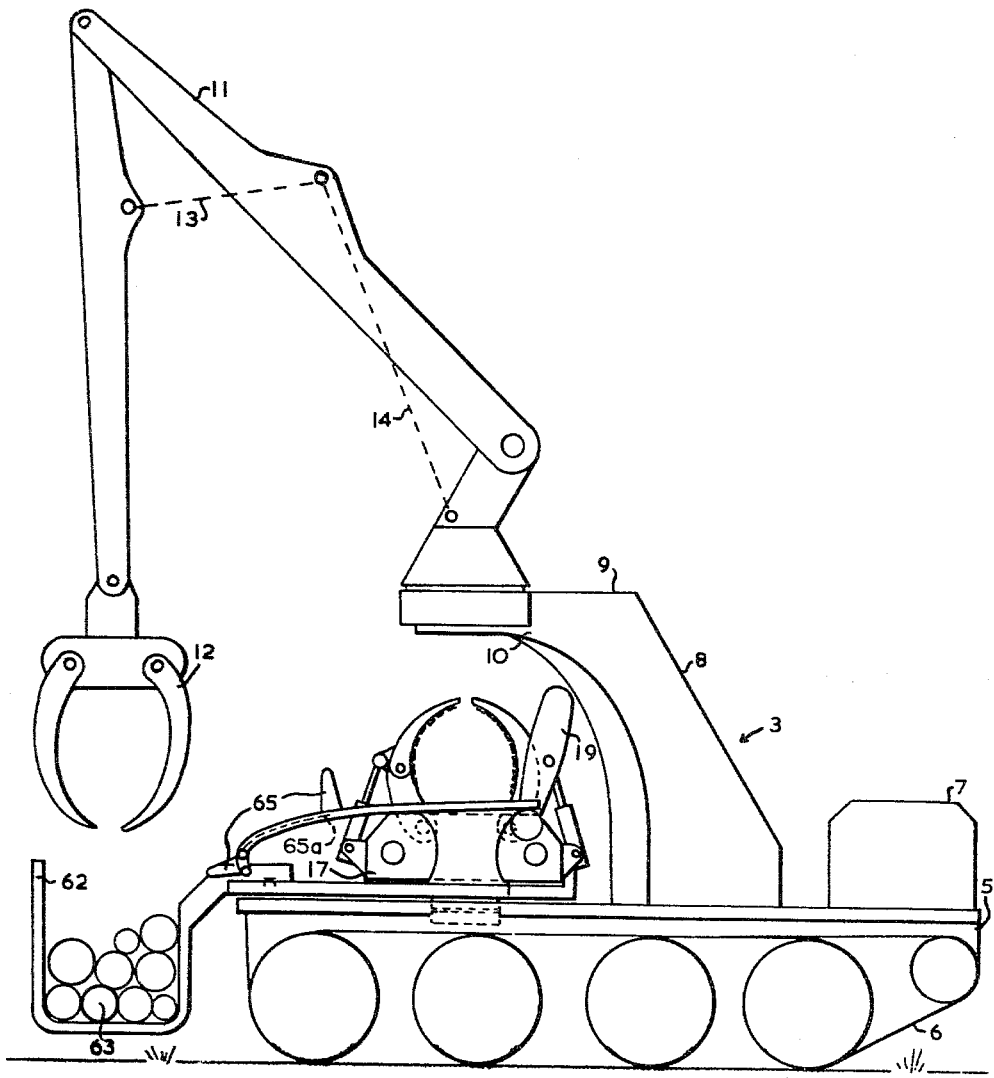
FIGURE 3 is a side elevation view of the mobile multi-tree length slasher apparatus of FIGURE 1.

Downwardly and outwardly inclined rails 60 and 61 which are mounted on swivel mounting plate 15 cause the cut bolts 63 of pulpwood lengths to be deposited in cradle 62. The movement of the bolts 63 from their cut or bucked position to the cradle 62 is aided by two sets of coupled guide arms 65 mounted on carrying rails 60 and 61. Guide arms 65 are coupled together by any suitable means as indicated at 65a and thus move as a unit along carrying rails 60 or 61 in the direction of cradle 62 under the influence of the weight of cut bolts 63 which it receives between the guide arms 65. When the bolt reaches the end of the carrying rails 60 or 61 the curved shape of the rails causes the leading guide arm 65 to tilt, as illustrated in FIGURE 3, to deposit the bolt in the cradle 62. The coupled guide arms 65 are then restored by hand or by any suitable means to receive more bolts. The pulpwood lengths are then transferred to pile 4 by means of knuckle boom 11. Cradle 62 is attached to swivel mounting plate 15. Cradle 62 which is usually of a ⅓ cord capacity can readily be removed when it is desired that the slasher apparatus travel from one location to another.

Having described the construction of the mobile multi-tree length slasher, its operation will now be described in reference to FIGURE 7 to FIGURE 10. The mobile slashing unit can accept skidded logs lying perpendicular to its line of travel or parallel with same or any angle between this. This is illustrated in FIGURE 1 where the feeding mechanism F in dotted outline is shown as being capable of rotating from position A to position B which is an angle of 90°. For ease of reconciliation with the accompanying drawings it is assumed that the tree length logs have been forwarded and deposited perpendicular to the direction of slasher travel.

Figure 9:
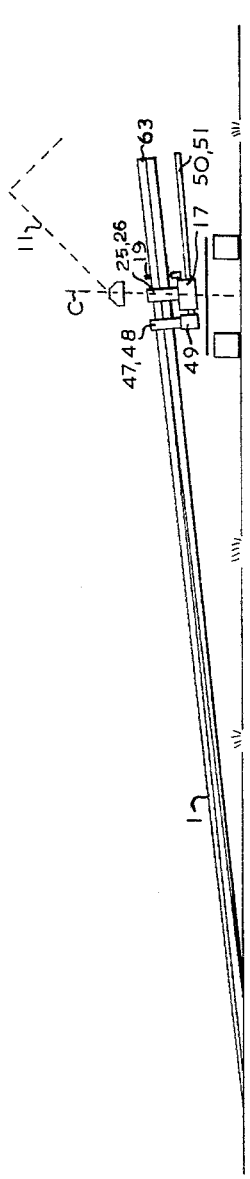
FIGURE 9 is a side elevation view showing the completion of log feed and starting of bucking or cutting operation.
Figure 10:
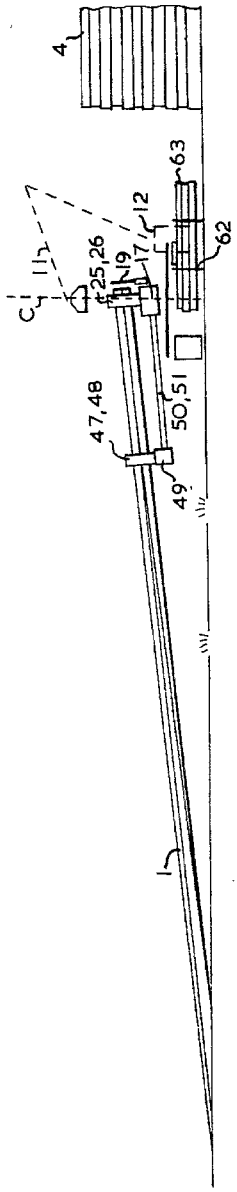
FIGURE 10 is a side elevation view showing the completion of bucking or cutting operation and removal of bucked or cut wood.

At the start of the feeding operation as illustrated by FIGURE 7, the feeding jaws 47 and 48, and holding jaws 25 and 26 are together and fully open. From one to five tree length logs are grasped from 4 feet to 5 feet from the butt ends by the boom 11 and grapple 12. The operator raises the logs by manipulating the boom 11 and places the butt ends in the open jaws. The boom 11 and feed mechanism housing 17 pivot around the same axis C. Therefore this operation is simplified to merely "knuckling in" the boom at the correct elevation, upon deposit of the butt ends across the jaws, reasonably even with the cutting plane, the operator closes the holding jaws 25 and 26 and starts the automatic feeding sequence of the slashing unit, which performs in the following manner:

The feeding jaws 47 and 48 encircle the stems, closing to a point sufficient to confine the logs but not securely enough, to restrict the outward movement of the feeding jaws 47 and 48 to approximately 100 inches. It will be obvious that at this time that closing of the holding jaws 25 and 26 and feeding jaws 47 and 48 automatically slews the cutting means into line with the logs being processed. As the feeding jaws 47 and 48 reach the maximum racked out position as shown in FIGURE 8 they are tightly closed. Coincident with the tensioning of the feeding jaws 47 and 48, the holding jaws 25 and 26 pressure is relaxed, the feeding jaws 47 and 48 with the bundle of logs now firmly grasped is racked in approximately 100 inches as shown in FIGURE 9, whereupon seizing pressure is again applied to the holding jaws. The cutting means 19 is activated as the holding jaws 25 and 26 tighten and the actual bucking or cutting operation is carried out. Upon completion of the cut as shown in FIGURE 10 the bolts which now lie on the carrying rails are moved down and outward to the edge of the chassis where they are deposited in cradle 62. The orderly movement of the bolts 63 from their buckled position to the cradle 62 is ensured by two sets of coupled guide arms, mounted on the carrying rails. As the bucked bolts 63 move to the cradle 62 the cutting means returns to its ready position and the feeding jaws 47 and 48 are racked out.

The bucking cycle is now repeated automatically until the stems have been cut down to approximately a 4 inch top with snipes falling through the feeding shafts to the ground.

During the automatic bucking cycle, which would consist of from 4 to 6 sequences depending on stem length the operator picks up the bucked wood which has accumulated in the cradle 62 and deposits same on a stock pile 4 parallel to the slasher machine.

The operator has ample time during the autobucking cycle to prepare the next charge of stems and have same loaded up in the grapple and positioned over the feeding mechanism awaiting completion of the final bucking cycle. When the operator observes the last feeding cycle of merchantable stems is near completion the automatic sequence is discontinued and both the holding jaws 25 and 26 and the feeding jaws 47 and 48 now together open fully for the next charge of the stems.

I claim:

1. A multi-tree length slasher apparatus for handling and cutting felled logs containing a log feeding mechanism which consists of a pair of holding jaws and a pair of feeding jaws, said holding and feeding jaws being mounted on a feed mechanism housing, a pair of feeding shafts on which the feeding jaws are mounted, slidable relative to said holding jaws so that movement of the feeding shafts substantially parallel to the axes of the logs moves the feeding jaws relative to the holding jaws, a means for extending and retracting said feeding shafts, a supporting chassis, a swivel mounting plate mounted on said chassis for rotation in a substantially horizontal plane, a pivotal mounting connecting said feed mechanism housing to said swivel mounting plate to enable the feed mechanism housing to be canted, a cutting means being connected to said feed housing mechanism so that at all positions of said feed mechanism the said cutting means will cut substantially perpendicular to the axis of the logs in engagement with said feeding mechanism, and a means for supplying logs to said feed mechanism and a means for removing cut logs from said feed mechanism.

2. A multi-tree length slasher apparatus for handling and cutting felled logs containing a log feeding mechanism which consists of a pair of articulated holding jaws and a pair of articulated feeding jaws, said holding and feeding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, a means for extending and retracting said feeding shafts, a supporting chassis, a swivel mounting plate mounted on said chassis for rotation on a substantially horizontal plane, a pivotal mounting connecting said feed mechanism housing to said swivel mounting plate to enable the feed mechanism housing to be canted, a cutting means being connected to said feed housing mechanism so that at all positions of said feed mechanism the said cutting means will cut substantially perpendicular to the axis of the logs in engagement with said feeding mechanism, and a means for supplying logs to said feed mechanism and a means for removing cut logs from said feed mechanism.

3. A multi-tree length slasher apparatus for handling and cutting felled logs containing a log feeding mechanism which consists of a pair of hydraulically articulated holding jaws and a pair of hydraulically articulated feeding jaws, said holding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, a means for extending and retracting said feeding shafts, a supporting chassis, a swivel mounting plate mounted on said chassis for rotation in a substantially horizontal plane, a pivotal mounting connecting said feed mechanism housing to said swivel mounting plate to enable the feed mechanism housing to be canted, a cutting means being connected to said feed housing mechanism so that at all positions of said feed mechanism the said cutting means will cut substantially perpendicular to the axis of the logs in engagement with said feeding mechanism, and a means for supplying logs to said feed mechanism and a means for removing cut logs from said feed mechanism.

4. An apparatus as in claim 3 in which said cutting means is a shearing means.

5. An apparatus as in claim 3 in which said cutting means is a chain saw.

6. A multi-tree length slasher apparatus for handling and cutting felled logs containing a log feeding mechanism which consists of a pair of hydraulically articulated holding jaws and a pair of hydraulically articulated feeding jaws, said holding and feeding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, a means for extending and retracting the said feeding shafts, said feeding mechanism housing being mounted on a swivel mounting plate in such a manner that it can both swivel and cant, a cutting means being connected to said feed housing mechanism so that at all positions of said feed mechanism the said cutting means will cut substantially perpendicular to the axis of the logs in engagement with said feeding mechanism, and a means for supplying logs to said feed mechanism and a means for removing cut logs from said feed mechanism.

7. An apparatus as in claim 6 in which said cutting means is a shearing means.

8. An apparatus as in claim 6 in which said cutting means is a chain saw.

9. An apparatus as in claim 6 in which said means for supplying logs to and removing cut logs from the said feed mechanism is a boom and grapple.

10. A multi-tree length slasher apparatus for handling and cutting felled logs containing a log feeding mechanism which consists of a pair of hydraulically articulated holding jaws and a pair of hydraulically articulated feeding jaws, said holding and feeding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, a means for extending and retracting the said feeding shafts, said feeding mechanism housing being mounted on a swivel mounting plate in such a manner that it can both swivel and cant, a hydraulically operated chain saw being connected to said feed housing mechanism so that at all positions of said feed mechanism the said saw will cut substantially perpendicular to the axis of the logs in the engagement with said feedng mechanism and a means for supplying logs to said feed mechanism and a means for removing cut logs from said feed mechanism.

11. An apparatus as in claim 10 in which said means for supplying logs to and removing cut logs from the said feed mechanism is a boom and grapple.

12. An apparatus as in claim 11 in which the means for removing cut logs from said feed mechanism includes a pair of carrying rails inclined downwardly away from the holding jaws and feeding jaws in a lateral direction, a pair of coupled guide arms slidably mounted on each carrying rail and adapted to receive a cut log and move downwardly in a controlled manner, means to retract said guide arms to a raised position upon the release from said guide arms of said cut log, said carrying rails being adapted to convey the cut logs to a detachable cradle mounted on said swivel mounting plate.

13. An apparatus as in claim 12 in which said holding jaws and said feeding jaws are lined with teeth-like perforations.

14. A multi-tree length slasher apparatus for handling and cutting felled logs containing a log feeding mechanism which consists of a pair of hydraulically articulated holding jaws and a pair of hydraulically articulated feeding jaws, said holding and feeding jaws being mounted on a feed mechanism housing, a pair of feeding shafts on which the feeding jaws are mounted, slidable relative to said holding jaws so that movement of the feeding shafts substantially parallel to the axes of the logs moves the feeding jaws relative to the holding jaws, a means for extending and retracting the said feeding shafts, said feeding mechanism housing being mounted on a swivel mounting plate in such a manner that it can both swivel and cant; a hydraulically operated chain saw being connected to said feed housing mechanism so that at all positions of said feed mechanism the said saw will cut substantially perpendicular to the axis of the logs in engagement with said feeding mechanism and a boom and grapple for supplying logs to and removing cut logs from the said feed mechanism, said boom and said feed mechanism being arranged to pivot around the same axis.

15. A multi-tree length slasher apparatus for handling and cutting felled logs containing a log feeding mechanism which consists of a pair of hydraulically articulated holding jaws and a pair of hydraulically articulated feeding jaws, said holding and feeding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, a motor driven rack and pinion arrangement for extending and retracting the said feeding shafts, said feeding mechanism housing being mounted on a swivel mounting plate in such a manner that it can both swivel and cant, a hydraulically operated chain saw being connected to said feed housing mechanism so that at all positions of said feed mechanism the said saw will cut substantially perpendicular to the axis of the logs in engagement with said feeding mechanism, a pair of carrying rails inclined downwardly away from the holding jaws and feeding jaws in a lateral direction, a pair of coupled guide arms slidably mounted on each carrying rail and adapted to receive a cut log and move downwardly in a controlled manner, means to retract said guide arms to a raised position upon the release from said guide arms of said cut log, said carrying rails being adapted to convey cut logs to a detachable cradle mounted on said swivel mounting plate and a boom and grapple for supplying logs to said feed mechanism and removing cut logs from said cradle, said boom and said feeding mechanism being arranged to pivot around the same axis.

16. An apparatus as in claim 15 in which said holding jaws and said feeding jaws are lined with teeth-like perforations.

17. A multi-tree length slasher apparatus for handling and cutting felled logs containing a log feeding mechanism which consists of a pair of hydraulically articulated holding jaws and a pair of hydraulically articulated feeding jaws, said holding and feeding jaws being mounted on a feed mechanism housing, a pair of feeding shafts, on which the feeding jaws are mounted, slidable relative to said holding jaws so that movement of the feeding shafts substantially parallel to the axes of the logs moves the feeding jaws relative to the holding jaws, an arrangement of levers and at least one hydraulic cylinder for extending and retracting the said feeding shafts, said feeding mechanism housing being mounted on a swivel mounting plate in such a manner that it can both swivel and cant, a hydraulically operated chain saw being connected to said feed housing mechanism so that at all positions of said feed mechanism the said saw will cut substantially perpendicular to the axis of the logs in engagement with said feeding mechanism, a pair of carrying rails inclined downwardly away from the holding jaws and feeding jaws in a lateral direction, a pair of coupled guide arms slidably mounted on each carrying rail and adapted to receive a cut log and move downwardly in a controlled manner, means to retract said guide arms to a raised position upon the release from said guide arms of said cut log, said carrying rails being adapted to convey cut logs to a detachable cradle mounted on said swivel mounting plate and a boom and grapple for supplying logs to said feed mechanism and removing cut logs from said cradle, said boom and said feeding mechanism being arranged to pivot around the same axis.

18. A method converting felled tree length logs into cut pulpwood length logs which comprises placing a plurality of the tree length logs into adjacent open feeding and holding jaws of the feed mechanism of a multi-tree slasher unit, closing said holding jaws to secure the logs to be cut, then loosely closing said feeding jaws to secure the logs therein and moving said feeding jaws to their outward position tightly closing said feeding jaws around the logs and simultaneously relaxing said holding jaws, racking the said feeding jaws in towards the said holding jaws moving the tree logs with them, closing said holding jaws tightly again, activating a cutting means which makes a cut substantially perpendicular to the axis of the logs in engagement with said feeding and holding jaws causing the cut logs to move down and outward on carrying rails to the edge of the chassis of said slasher unit where they are deposited in a cradle and then removing said cut logs to a stockpile of cut pulpwood length logs, and upon completion of the shearing operation racking out the feeding jaws ready to repeat the foregoing cycle until the tree length logs have been cut down so that the snipes fall from the said feed mechanism to the ground.

References Cited by the Examiner

UNITED STATES PATENTS

| | | | |
|---|---|---|---|
| 2,579,613 | 12/1951 | Rambo et al. | 144—208 |
| 2,614,589 | 10/1952 | Coats et al. | 143—46 |
| 2,635,659 | 4/1953 | Gerdine | 144—3 |
| 2,882,941 | 4/1959 | Pope | 144—3 |
| 2,960,123 | 11/1960 | O'Quinn | 143—92 |
| 2,981,301 | 4/1961 | Bush et al. | 143—46 |

FOREIGN PATENTS 621,584  6/1961  Canada.

HAROLD D. WHITEHEAD, *Primary Examiner.*

WILLIAM W. DYER, ROBERT C. RIORDON,
*Examiners.*